No. 703,422. Patented July 1, 1902.
J. JACKSON.
TOY.
(Application filed Nov. 7, 1901.)

(No Model.)

Witnesses.
Benjamin Clark.
Charles H. Briggs.

Inventor:—
John Jackson.
Per E. Eaton.
His Attorney.

UNITED STATES PATENT OFFICE.

JOHN JACKSON, OF ALNWICK, ENGLAND.

TOY.

SPECIFICATION forming part of Letters Patent No. 703,422, dated July 1, 1902.

Application filed November 7, 1901. Serial No. 81,500. (No model.)

*To all whom it may concern:*

Be it known that I, JOHN JACKSON, a subject of the King of Great Britain, and a resident of Alnwick, in the county of Northumberland, England, have invented certain new and useful Improvements in Toys, (for which I have applied for a patent in Great Britain, No. 16,519, dated August 16, 1901,) of which the following is a full, clear, and exact specification.

This invention relates to a new or improved toy.

I provide a base having a sliding piece carrying the figure of an animal, such as a dog. The base also carries on the fixed part the figure of another animal, such as a cat, arranged so that the two animals face one another, the desired portion of the cat being in connection with the sliding piece, so that when said sliding piece is operated the fixed animal is caused to change its attitude upon the approach of the movable animal carried by the sliding piece, thereby producing an amusing effect.

Figure 1:
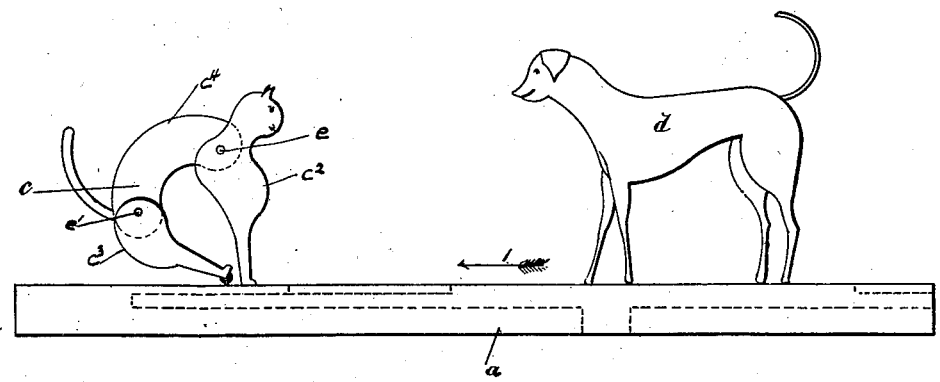
Figure 2:
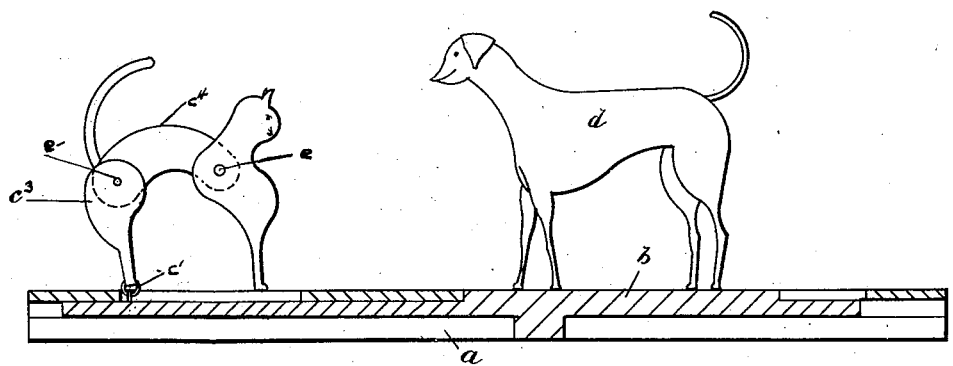
Figure 3:
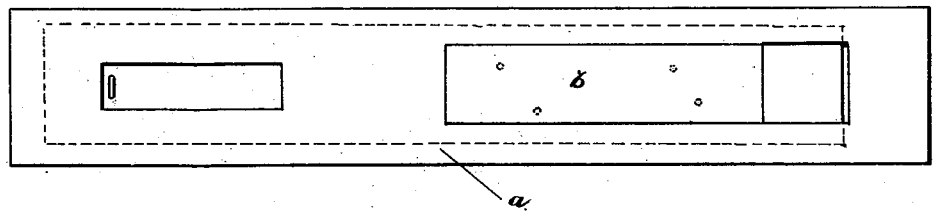

Referring to the annexed drawings, Figure 1 is a side elevation of my invention in normal position; Fig. 2, side elevation of my invention when operated; Fig. 3, plan view of my invention with animals removed.

The base $a$ has a sliding portion $b$, to which is pivoted the hind legs $c^3$ of the cat or other figure $c$ in any suitable manner, such as by the hook and eye $c'$, the front portion and legs $c^2$ of said figure $c$ being rigidly secured to the base $a$. The hind legs $c^3$ and body $c^4$ of said figure are pivotally attached to the body $c^4$ and front portion $c^2$, respectively, such as by the pins $e$ and $e'$. The sliding portion $b$ aforesaid also carries the dog or other figure $d$, which is rigidly connected thereto. Upon sliding the portion $b$ in the direction of the arrow 1 the figure $d$ is caused to approach the figure $c$, which at the same time, through the medium of the pivoted parts aforesaid, assumes the position shown in Fig. 2, thereby producing a humorous effect. It will be seen that I may employ any number of figures, as desired.

Having thus described my invention, what I claim, and desire to secure by Letters Patent, is—

In toys of the class herein described, two or more animal figures secured to a base, one or more of which have their hind legs pivotally connected to a sliding portion of said base, and their legs and body pivotally attached together, so that when one figure approaches another, the second is caused to change its position, substantially as described and illustrated herein.

In testimony that I claim the foregoing I have hereunto set my hand this 18th day of September, 1901.

JOHN JACKSON.

Witnesses:
CHAS. WEBSTER,
MAURICE C. HILL.